United States Patent
Fukui

(10) Patent No.: US 12,243,299 B2
(45) Date of Patent: Mar. 4, 2025

(54) OBJECT TRACKING APPARATUS, OBJECT TRACKING METHOD AND RECORDING MEDIUM

(71) Applicant: NEC Corporation, Tokyo (JP)

(72) Inventor: Hiroshi Fukui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 442 days.

(21) Appl. No.: 17/788,444

(22) PCT Filed: Dec. 26, 2019

(86) PCT No.: PCT/JP2019/051088
§ 371 (c)(1),
(2) Date: Jun. 23, 2022

(87) PCT Pub. No.: WO2021/130951
PCT Pub. Date: Jul. 1, 2021

(65) Prior Publication Data
US 2023/0031931 A1 Feb. 2, 2023

(51) Int. Cl.
*G06V 10/82* (2022.01)
*G06T 7/246* (2017.01)
*G06T 7/70* (2017.01)

(52) U.S. Cl.
CPC ............. *G06V 10/82* (2022.01); *G06T 7/246* (2017.01); *G06T 7/70* (2017.01); *G06V 2201/07* (2022.01)

(58) Field of Classification Search
None
See application file for complete search history.

(56) References Cited

U.S. PATENT DOCUMENTS 9,858,496 B2  1/2018  Sun et al.
2009/0262981 A1  10/2009  Ike et al.
(Continued)

FOREIGN PATENT DOCUMENTS

EP  3499454 A1 *  6/2019  ........... G06K 9/3241
JP  2009-265732 A  11/2009
(Continued)

OTHER PUBLICATIONS

International Search Report for PCT Application No. PCT/JP2019/051088, mailed on Mar. 10, 2020.
(Continued)

*Primary Examiner* — Dov Popovici

(57) ABSTRACT

An object tracking apparatus (1) includes: a first generation unit (221-224) for generating, based on a first position information ($PI_{t-\tau}$) related to a position of an object ($O_{t-\tau}$) in a first image ($IM_{t-\tau}$) captured at a first time (t-τ) and a second position information ($PI_t$) related to a position of an object ($O_t$) in a second image ($IM_t$) captured at a second time (t), first and second feature vectors ($CV_{t-\tau}$, $CV_t$); and a second generation unit (225) for generating, as a correspondence information (AM) indicating a correspondence relationship between the object in the first image and the object in the second image, an information that is obtained by a calculation processing using the first and the second feature vectors.

15 Claims, 9 Drawing Sheets

(56) References Cited

U.S. PATENT DOCUMENTS

| | | | |
|---|---|---|---|
| 2018/0137642 A1 | 5/2018 | Malisiewicz et al. | |
| 2018/0218212 A1 | 8/2018 | Yoshikawa et al. | |
| 2020/0134436 A1 | 4/2020 | Kataeva et al. | |
| 2023/0107372 A1* | 4/2023 | Shibata | G06T 7/277 382/103 |
| 2023/0316701 A1* | 10/2023 | Ishihara | G06V 10/761 382/190 |

FOREIGN PATENT DOCUMENTS

| | | |
|---|---|---|
| JP | 2012-181710 A | 9/2012 |
| JP | 2016-071830 A | 5/2016 |
| JP | 2018-124733 A | 8/2018 |
| JP | 2019-536154 A | 12/2019 |
| WO | 2018/030048 A1 | 2/2018 |
| WO | 2019/008951 A1 | 1/2019 |

OTHER PUBLICATIONS

C.Feichtechofer et al., "Detect to Track and Track to Detect", 2017 IEEE International Conference on Computer Vision (ICCV), Oct. 2017.

Yihong Xu et al., "DeepMOT: A Differentiable Framework for Training Multiple Object Trackers", Proceedings of 2017 IEEE International Conference on Computer Vision (ICCV2017), IEEE, Oct. 29, 2017, pp. 3057-3065.

Xingyi Zhou et al., "Object as Points", arXiv 1904.07850. Apr. 2019.

Detection Shaoqing Ren et al., "Faster R-CNN: Towards Real-Time Object Detection with Region Proposal Neworks", IEEE Transactions on Patten Analysis and Machine Intelligence, pp. 1137-1149, Jun. 6, 2016.

Wei Liu et al., "SSD: Single Shot MultiBox Detector", European Conference on Computer Vision, pp. 21-37, Sep. 2016.

* cited by examiner

OBJECT TRACKING APPARATUS, OBJECT TRACKING METHOD AND RECORDING MEDIUM This application is a National Stage Entry of PCT/JP2019/051088 filed on Dec. 26, 2019, the contents of all of which are incorporated herein by reference, in their entirety.

TECHNICAL FIELD

This disclosure relates to a technical field of an object tracking apparatus, an object tracking method and a recording medium that are configured to track an object included in a plurality of image that correspond to time-series data.

BACKGROUND ART

An object tracking apparatus that tracks an object included in images by using a plurality of images that are captured by a camera or the like and that are time-series data is known. One example of the object tracking apparatus is disclosed in a Patent Literature 1 to a Patent Literature 3. Furthermore, one example of an algorithm for tracking the object is disclosed in a non-Patent Literature 1 to a non-Patent Literature 2. Additionally, there is a non-Patent Literature 3 as a background art document related to this disclosure.

CITATION LIST

Patent Literature

Patent Literature 1: JP2009-265732A
Patent Literature 2: JP2012-181710A
Patent Literature 3: JP2016-71830A
Patent Literature 4: U.S. Pat. No. 9,858,496B

Non-Patent Literature

Non-Patent Literature 1: C. Feichtechofer et al., "Detect to Track and Track to Detect", ICCV2017, October 2017
Non-Patent Literature 2: Yihong Xu et al., "DeepMOT: A Differentiable Framework for Training Multiple Object Trackers", arXiv 1906.06618, January 2019
Non-Patent Literature 3: Xingyi Zhou et al., "Object as Points", arXiv 1904.07850, April 2019
Non-Patent Literature 4: Shaoqing Ren et al., "Faster R-CNN: Towards Real-Time Object Detectin with Region Proposal Neworks", IEEE Transactions on Patten Analysis and Machine Intelligence, pp. 1137 to 1149, Jun. 6, 2016
Non-Patent Literature 5: Wei Liu et al., "SSD: Single Shot MultiBox Detector", European Conference on Computer Vision, pp. 21 to 37, September 2016

SUMMARY

Technical Problem

The conventional object tracking apparatus performs, as separate operations that are independent from each other, an object detection operation for detecting the object included in the image and an object matching operation for performing a matching between an object $O_{t-\tau}$ included in an image $IM_{t-\tau}$ at a time t-τ (note that τ indicates a reference cycle) and an object $O_t$ included in an image $IM_t$ at a time t. Thus, the conventional object tracking apparatus needs to perform a pre-processing and the like in order to perform the object matching operation after performing the object detection operation. As a result, there is a possibility that a processing cost for tracking the object is relatively high in the conventional object tracking apparatus.

It is an example object of this disclosure to provide an object tracking apparatus, an object tracking method and a recording medium that are configured to solve the above described technical problem. As one example, it is an example object of this disclosure to provide an object tracking apparatus, an object tracking method and a recording medium that are configured to track an object with relatively low processing cost.

Solution to Problem

One example aspect of an object tracking apparatus includes: a first generation unit that is configured to generate, based on a first position information related to a position of an object in a first image captured at a first time and a second position information related to a position of an object in a second image captured at a second time that is different from the first time, a first feature vector representing a feature of the first position information and a second feature vector representing a feature of the second position information; and a second generation unit that is configured to generate, as a correspondence information indicating a correspondence relationship between the object in the first image and the object in the second image, an information that is obtained by a calculation processing using the first and the second feature vectors.

One example aspect of an object tracking method includes: generating, based on a first position information related to a position of an object in a first image captured at a first time and a second position information related to a position of an object in a second image captured at a second time that is different from the first time, a first feature vector representing a feature of the first position information and a second feature vector representing a feature of the second position information; and generating, as a correspondence information indicating a correspondence relationship between the object in the first image and the object in the second image, an information that is obtained by a calculation processing using the first and the second feature vectors.

One example aspect of a recording medium is a non-transitory recording medium on which a computer program that allows a computer to execute an object tracking method is recorded, the object tracking method includes: generating, based on a first position information related to a position of an object in a first image captured at a first time and a second position information related to a position of an object in a second image captured at a second time that is different from the first time, a first feature vector representing a feature of the first position information and a second feature vector representing a feature of the second position information; and generating, as a correspondence information indicating a correspondence relationship between the object in the first image and the object in the second image, an information that is obtained by a calculation processing using the first and the second feature vectors.

Effect

One example aspect of each of the object tracking apparatus, the object tracking method and the recording medium described above is capable of tracking the object with a relatively low processing cost, because the correspondence information is generated by a calculation processing using the first and second feature vectors described later in detail.

DESCRIPTION OF EXAMPLE EMBODIMENTS

Next, an example embodiment of an object tracking apparatus, an object tracking method and a recording medium will be described with reference to the drawings. In the below described description, an object tracking apparatus 1 to which the example embodiment of the object tracking apparatus, the object tracking method and the recording medium is applied will be described. The object tracking apparatus 1 performs an object tracking operation for tracking an object included in each image IM when a plurality of images IM corresponding to time-series data are inputted thereto. The object tracking operation includes an object detection operation for detecting an object O included in the image IM, for example. The object tracking operation includes an object matching operation for tracking a position of an object $O_{t-\tau}$, which has been included in an image $IM_{t-\tau}$, in an image $IM_t$ by performing a matching between at least one object $O_{t-\tau}$ included in the image $IM_{t-\tau}$ obtained (for example, captured) at a time t-τ (note that τ indicates a reference cycle) and at least one object $O_t$ included in the image $IM_t$ obtained at a time t, for example. The object tracking operation includes a refinement operation for correcting a detected result of the object $O_t$ included in the image $IM_t$ (namely, a result of the object detection operation) by using a result of the object matching operation.

Note that an expression "X and/or Y" is used as an expression including both of an expression "X and Y" and an expression "X or Y" in the below described description.

(1) Configuration of Object Tracking Apparatus 1

Figure 1:
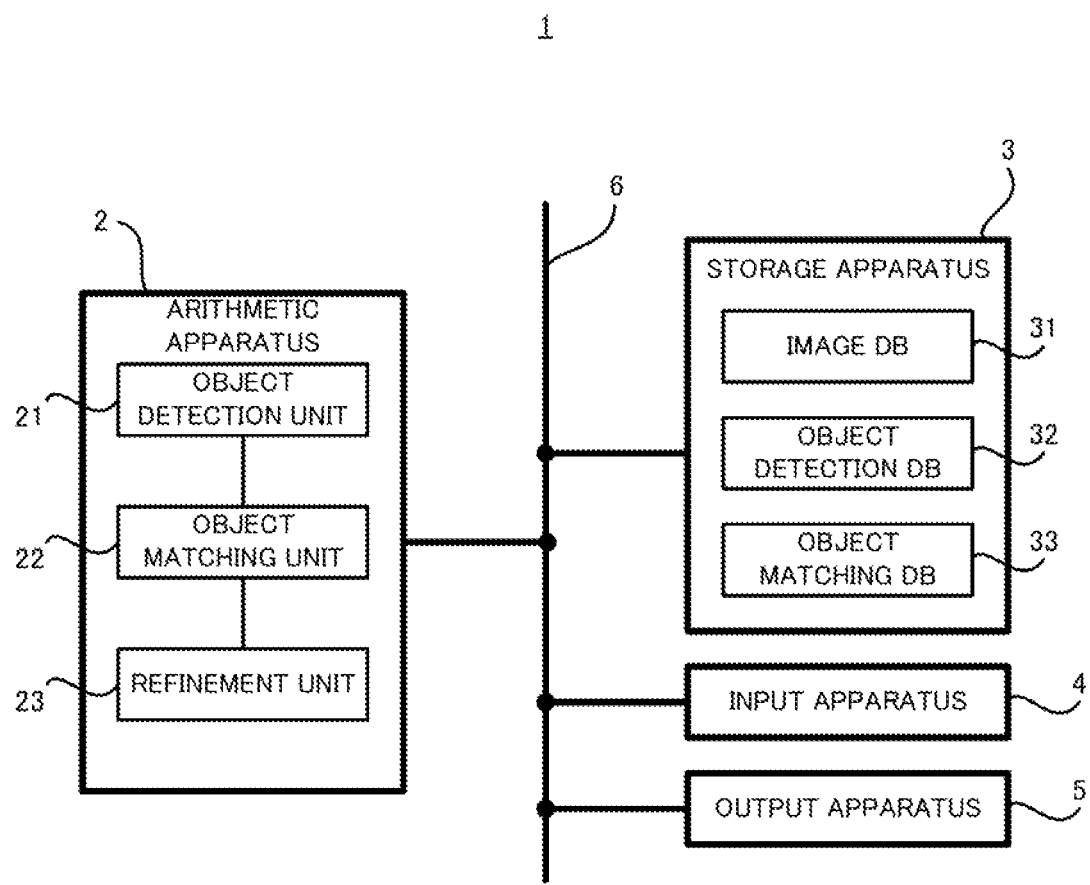
FIG. 1 is a block diagram that illustrates a configuration of an object tracking apparatus in a present example embodiment.
Figure 2:
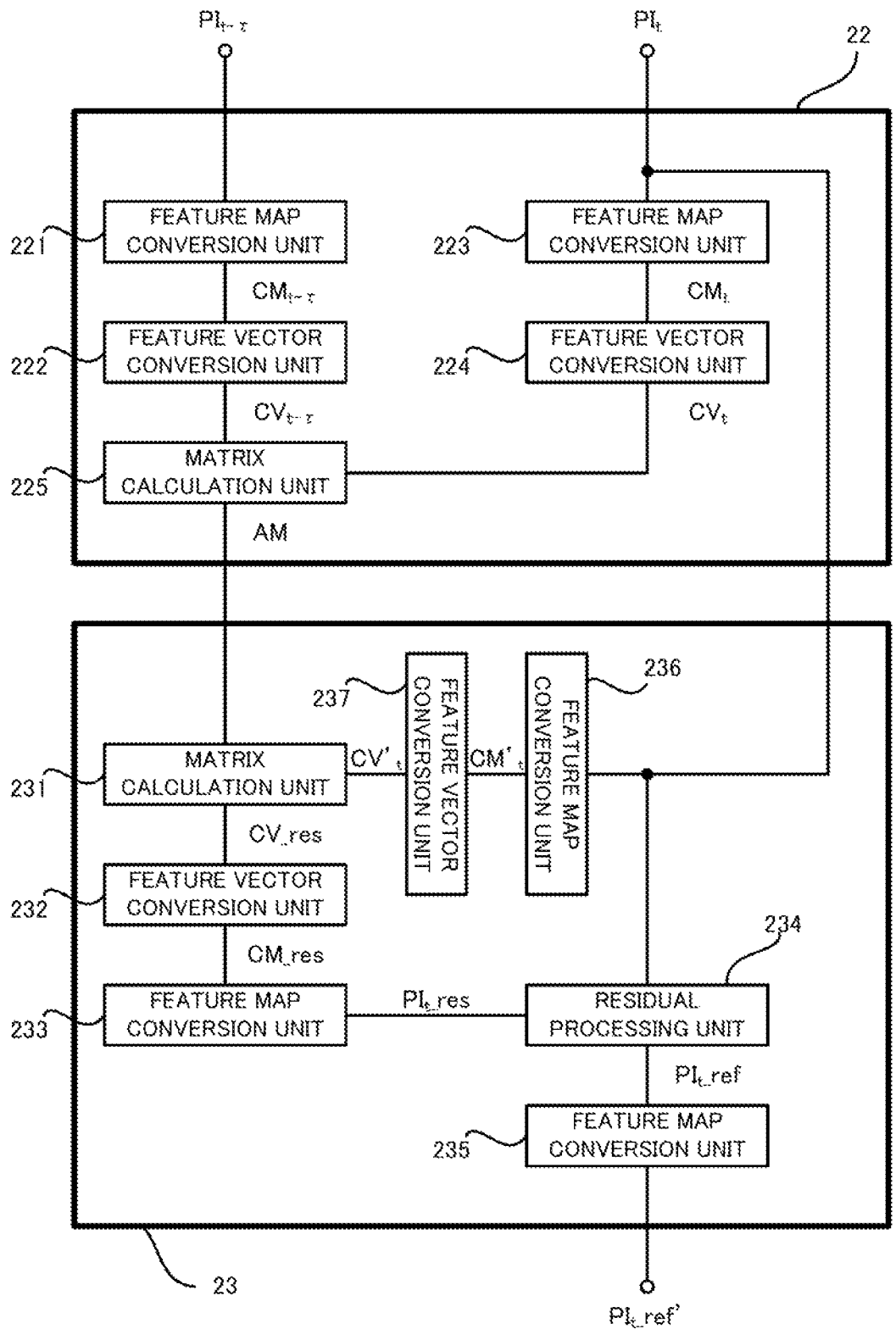
FIG. 2 is a block diagram that illustrates a configuration of logical functional blocks implemented in the object tracking apparatus for performing an object matching operation and a refinement operation.

Firstly, with reference to FIG. 1 and FIG. 2, a configuration of the object tracking apparatus 1 in the present example embodiment will be described. FIG. 1 is a block diagram that illustrates the configuration of the object tracking apparatus 1 in the present example embodiment. FIG. 2 is a block diagram that illustrates a configuration of logical functional blocks implemented in the object tracking apparatus 1 for performing the object matching operation and the refinement operation.

As illustrated in FIG. 1, the object tracking apparatus 1 includes an arithmetic apparatus 2 and a storage apparatus 3. Furthermore, the object tracking apparatus 1 may include an input apparatus 4 and an output apparatus 5. However, the object tracking apparatus 1 may not include at least one of the input apparatus 4 and the output apparatus 5. The arithmetic apparatus 2, the storage apparatus 3, the input apparatus 4 and the output apparatus 5 are interconnected through a data bus 6.

The arithmetic apparatus 2 includes at least one of a CPU (Central Processing Unit) and GPU (Graphical Processing Unit, for example. The arithmetic apparatus 2 reads a computer program. For example, the arithmetic apparatus 2 may read a computer program stored in the storage apparatus 3. For example, the arithmetic apparatus 2 may read a computer program stored in a computer-readable non-transitory recording medium, by using a not-illustrated recording medium reading apparatus. The arithmetic apparatus 2 may obtain (namely, download or read) a computer program from a not-illustrated apparatus placed outside the object tracking apparatus 1 through a not-illustrated communication apparatus. The arithmetic apparatus 2 executes the read computer program. As a result, a logical functional block for performing an operation (specifically, the above described object tracking operation) that should be performed by the object tracking apparatus 1 is implemented in the arithmetic apparatus 2. Namely, the arithmetic apparatus 2 is configured to serve as a controller for implementing the logical block for performing the object tracking operation.

FIG. 1 illustrates one example of the logical functional block that is implemented in the arithmetic apparatus 2 for performing the object tracking operation. As illustrated in FIG. 1, an object detection unit 21, an object matching unit 22 and a refinement unit 23 are implemented in the arithmetic apparatus 2 as the logical functional blocks. The object detection unit 21 performs the object detection operation. The object matching unit 22 performs the object matching operation. In order to perform the object matching operation, as illustrated in FIG. 2, the object matching unit 22 includes a feature map conversion unit 221, a feature vector conversion unit 222, a feature map conversion unit 223, a feature vector conversion unit 224 and a matrix calculation unit 225. The refinement unit 23 performs the refinement operation. In order to perform the refinement operation, as illustrated in FIG. 2, the refinement unit 23 includes a matrix calculation unit 231, a feature vector conversion unit 232, a feature map conversion unit 233, a residual processing unit 234 and a feature map conversion unit 235. Note that the object detection operation, the object matching operation and the refinement operation will be described later in detail.

The storage apparatus 3 is configured to store desired data. For example, the storage apparatus 3 may temporarily store the computer program that is executed by the arithmetic apparatus 2. The storage apparatus 3 may temporarily store data temporarily used by the arithmetic apparatus 2 when the arithmetic apparatus 2 executes the computer program. The storage apparatus 3 may store data stored for a long term by the object tracking apparatus 1. Especially in the present example embodiment, the storage apparatus 3 may store an image DB (DataBase) 31 for storing the plurality of images IM that are captured by a not-illustrated camera and that are the time-series data. Furthermore, the storage apparatus 3 may store an object detection DB 32 for storing an object detection information indicating the result of the object detection operation (namely, an information related to the detected result of the object O included in the image IM). Furthermore, the storage apparatus 3 may store an object matching DB 33 for storing an object matching information indicating the result of the object matching operation (namely, an information related to a matching result of the object $O_{t-\tau}$ included in the image $IM_{t-\tau}$ and the object $O_t$ included in the image $IM_{t-\tau}$, and typically an information indicating a correspondence between the object $O_{t-\tau}$ and the object $O_t$). Note that the storage apparatus 3 may include at least one of a RAM (Random Access Memory), a ROM (Read Only Memory), a hard disk apparatus, a magneto-optical disc, a SSD (Solid State Drive) and a disk array apparatus. Namely, the storage apparatus 3 may include a non-transitory recording medium.

An input apparatus 4 is an apparatus that is configured to receive an input of an information from an outside of the object tracking apparatus 1 to the object tracking apparatus 1. In the present example embodiment, the plurality of images IM that are captured by the not-illustrated camera and that are the time-series data are inputted to the input apparatus 4. The plurality of images IM inputted to the input apparatus 4 are stored in the image DB 31 stored in the storage apparatus 3.

The output apparatus 5 is an apparatus that is configured to output an information to an outside of the object tracking apparatus 1. For example, the output apparatus 5 may output an information related to a result of the object tracking operation. For example, the output apparatus 5 may output, as an image, the information related to the result of the object tracking operation. In this case, the output apparatus 5 may include a display apparatus that is configured to display the image. For example, the output apparatus 5 may output, as data, the information related to the result of the object tracking operation. In this case, the output apparatus 5 may include a data output apparatus that is configured to output the data.

(2) Object Tracking Operation Performed by Object Tracking Apparatus 1

Next, the object tracking operation performed by the object tracking apparatus 1 will be described. As described above, the object tracking operation includes the object detection operation, the object matching operation and the refinement operation. Therefore, in the below described description, the object detection operation, the object matching operation and the refinement operation will be described in sequence.

(2-1) Object Detection Operation

Firstly, the object detection operation performed by the object detection unit 21 will be described. The object detection unit 21 reads the image IM stored in the image DB 31 and performs the object detection operation on the read image IM. The object detection unit 21 may detect the object O included in the image IM by using an existing method of detecting an object included in an image. However, it is preferable that the object detection unit 21 perform the object detection operation by using a method that is capable of obtaining an information (hereinafter, it is referred to as an "object position information PI") related to a position of the object O in the image IM by detecting the object O included in the image IM. The object position information PI obtained by the object detection unit 21 is stored in the object detection DB 32 as the object detection information indicating the result of the object detection operation by the object detection unit 21.

In the present example embodiment, an example in which the object detection unit 21 detects the object O by using a method disclosed in the above described non-Patent Literature 3 (what we call a CenterNet). In this case, the object detection unit 21 generates, as the object position information PI, a heat map (what we call a score map) indicating a center point (a Key Point) KP of the object O in the image IM. More specifically, the object detection unit 21 generates the heat map indicating the center point KP of the object O in the image IM for each class of the object O. Thus, an information indicating the center point KP of the object O in the image IM is a map information having a size of H×W×K, wherein H is the H is the number of pixel of the image IM along a vertical direction, W is the number of pixel of the image IM along a horizontal direction and K is the number of class. Note that the heat map indicating the center point KP may be referred to as a position map, because it is a map related to the position.

When the object detection unit 21 detects the object O by using the method disclosed in the non-Patent Literature 3, the object detection unit 21 may generate, as the object position information PI, an information that indicates a size of a detection frame (a Bounding Box) BB of the object O as a score map. The information indicating the size of the detection frame BB of the object O may be regarded to be substantially an information indicating a size of the object O. The information indicating the size of the detection frame BB of the object O is a map information having a size of H×W×2, for example. Note that the map information indicating the size of the detection frame BB of the object O may be referred to as the position map too, because it is a map related to the position.

When the object detection unit 21 detect the object O by using the method disclosed in the non-Patent Literature 3, the object detection unit 21 may generate, as the object position information PI, an information that indicates a correction amount (a Local Offset) of the detection frame of the object O as the score map. The information indicating the correction amount of the detection frame BB of the object O is a map information having a size of H×W×2. Note that the map information indicating the correction amount of the detection frame BB may be referred to as the position map too, because it is a map related to the position.

Figure 3:
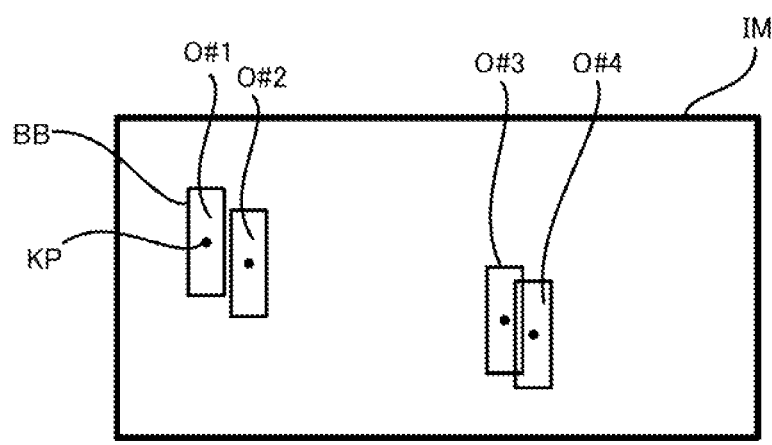
FIG. 3 is a planar view that conceptionally illustrates an object position information detected by an object detection operation.

FIG. 3 is a planar view that conceptually illustrates the object position information PI detected by the object detection operation. FIG. 3 illustrates an example in which four objects O (specifically, an object O #1, an object O #2, an object O #3 and an object O #4) are included in the image IM. In this case, the object detection unit 21 generates, as the object position information PI, the information indicating the center point KP of each of the four objects O, the information indicating the size of the detection frame BB of each of the four objects O and the information indicating the correction amount of the detection frame BB of each of the four objects O.

The object detection unit 21 may perform the object detection operation by using a calculation model that is configured to output the object position information PI when the image IM is inputted thereto. One example of the calculation model is a calculation model using a Neural Network (for example, a CNN: Convolutional Neural Network). In this case, a learning of the calculation model may be performed by using learning data, as described later. Namely, a parameter of the calculation model may be optimized so as to output the proper object position information PI.

However, the object detection unit 21 may perform the object detection operation by using another method that is different from the method (what we call the CenterNet) disclosed in the non-Patent Literature 3. A method that is disclosed in the non-Patent Literature 4 and that is referred to as a "Faster R-CNN" and a method that is disclosed in the non-Patent Literature 5 and that is referred to as a "SSD" are examples of another method.

(2-2) Object Matching Operation

Figure 4:
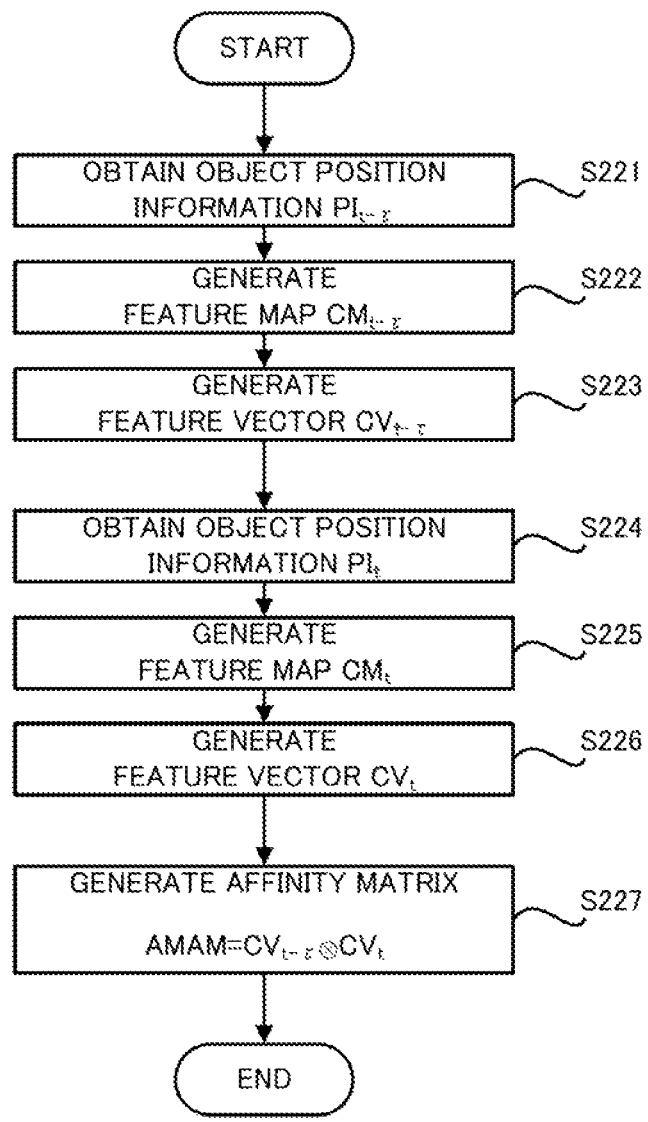
FIG. 4 is a flow chart that illustrates a flow of the object matching operation.

Next, the object matching operation performed by the object matching unit 22 will be described. The object matching unit 22 reads the object position information PI stored in the object detection DB 32 and performs the object matching operation by using the read object position information PI. In the below described description, with reference to FIG. 4, the object matching operation for performing the matching between the object $O_{t-\tau}$ included in the image $IM_{t-\tau}$ captured at the time t-τ and the object $O_t$ included in the image $IM_t$ captured at the time t will be described. FIG. 4 is a flowchart that illustrates a flow of the object matching operation.

As illustrated in FIG. 4, the object matching unit 22 generate a feature vector CV from the object position information PI (a step S221 to a step S226). In the present example embodiment, the object matching unit 22 generates a feature map CM from the object position information PI, and then generates the feature vector CV form the feature map CM, in order to generate the feature vector CV from the object position information. The feature map CM is a feature map that indicates a feature of the object position information PI for each channel. Namely, when the number of the channel is C, the object matching unit 22 generates the feature map CM having a size of H×W×C from the object position information PI that is the map information having a size of H×W×(K+2+2)=H×W×(K+4) (K is the number of the class of the object O as described above, typically, the number of the class registered in the object detection DB 32 or the object matching DB 33), and then, generates the feature vector CV having a size of HW×C from the feature map CM having the size of H×W×C. However, the object matching unit 22 may directly generate the feature vector CV from the object position information PI without generating the feature map CM.

Specifically, the feature map conversion unit 221 that is one specific example of a "first generation unit" obtains, from the object detection DB 32, an object position information $PI_{t-\tau}$ related to the object $O_{t-\tau}$ included in the image $IM_{t-\tau}$ captured at the time t-τ (the step S221). Note that the object position information $PI_{t-\tau}$ is one specific example of a first position information. For example, when the four objects $O_{t-\tau}$ are included in the image $IM_{t-\tau}$ as illustrated in FIG. 3, the feature map conversion unit 221 obtains, from the object detection DB 32, an object position information $PI_{t-\tau}$ related to the four objects $O_{t-\tau}$. Then, the feature map conversion unit 221 generates a feature map $CM_{t-\tau}$ from the object position information $PI_{t-\tau}$ obtained at the step S221 (the step S222). The feature map conversion unit 221 generates the feature map $CM_{t-\tau}$ having the size of H×W×C from the object position information $PI_{t-\tau}$ that is the map information having the size of H×W×(K+4).

For example, the feature map conversion unit 221 may generate the feature map $CM_{t-\tau}$ by using a calculation model that is configured to output the feature map CM when the object position information PI is inputted thereto. One example of the calculation model is a calculation model using a Neural Network (for example, a CNN: Convolutional Neural Network). In this case, a learning of the calculation model may be performed by using learning data, as described later. Namely, a parameter of the calculation model may be optimized so as to output the proper feature map CM (especially, the feature map CM that is suitable for generating an affinity matrix AM described later).

Then, the feature vector conversion unit 222 that is one specific example of the "first generation unit" generates a feature vector $CV_{t-\tau}$ from the feature map $CM_{t-\tau}$ generated at the step S222 (the step S223). The feature vector conversion unit 222 generates the feature vector $CV_{t-\tau}$ having the size of HW×C from the feature map $CM_{t-\tau}$ having the size of H×W×C. Note that the feature vector $CV_{t-\tau}$ is one specific example of a first feature vector.

In parallel with, after or before the processing from the step S221 to the step S223, the feature map conversion unit 223 that is one specific example of the "first generation unit" obtains, from the object detection DB 32, an object position information $PI_t$ related to the object $O_t$ included in the image $IM_t$ captured at the time t (the step S224). Note that the object position information $PI_t$ is one specific example of a second position information. Then, the feature map conversion unit 223 generates a feature map $CM_t$ from the object position information $PI_t$ obtained at the step S224 (the step S225). The feature map conversion unit 221 generates the feature map $CM_t$ having the size of H×W×C from the object position information $PI_t$ that is the map information having the size of H×W×(K+4). Note that a detail of the processing from the step S224 to the step S225 may be same as a detail of the processing from the step S221 to the step S222 described above. Thus the feature map conversion unit 223 may generate the feature map $CM_t$ by using the calculation model that is configured to output the feature map CM when the object position information PI is inputted thereto, as with the feature map conversion unit 221.

Then, the feature vector conversion unit 224 that is one specific example of the "first generation unit" generates a feature vector $CV_t$ from the feature map $CM_t$ generated at the step S225 (the step S226). The feature vector conversion unit 224 generates the feature vector $CV_t$ having the size of HW×C from the feature map $CM_t$ having the size of H×W×C. Note that a detail of the processing at the step S226 may be same as a detail of the processing at the step S223 described above. Note that the feature vector $CV_t$ is one specific example of a second feature vector.

Then, the matrix calculation unit 225 that is one specific example of a "second generation unit" generates the affinity matrix AM by using the feature vector $CV_{t-\tau}$ generated at the step S223 and the feature vector $CV_t$ generated at the step S226 (a step S227). Specifically, the matrix calculation unit 225 generates, as the affinity matrix AM, an information that is obtained by a calculation processing using the feature vector $CV_{t-\tau}$ and the feature vector $CV_t$.

For example, the matrix calculation unit 225 may generate, as the affinity matrix AM, an information that is obtained by a calculation processing for calculating a matrix product (a matrix multiplication) of the feature vector $CV_{t-\tau}$ and the feature vector $CV_t$ (the matrix product of the feature vector $CV_{t-\tau}$ and the feature vector $CV_t$.). The matrix product here may be a tensor product (a direct product). As one example, the matrix product may be a Kronecker product. In this case, a size of the affinity matrix is HW×HW.

Figure 5:
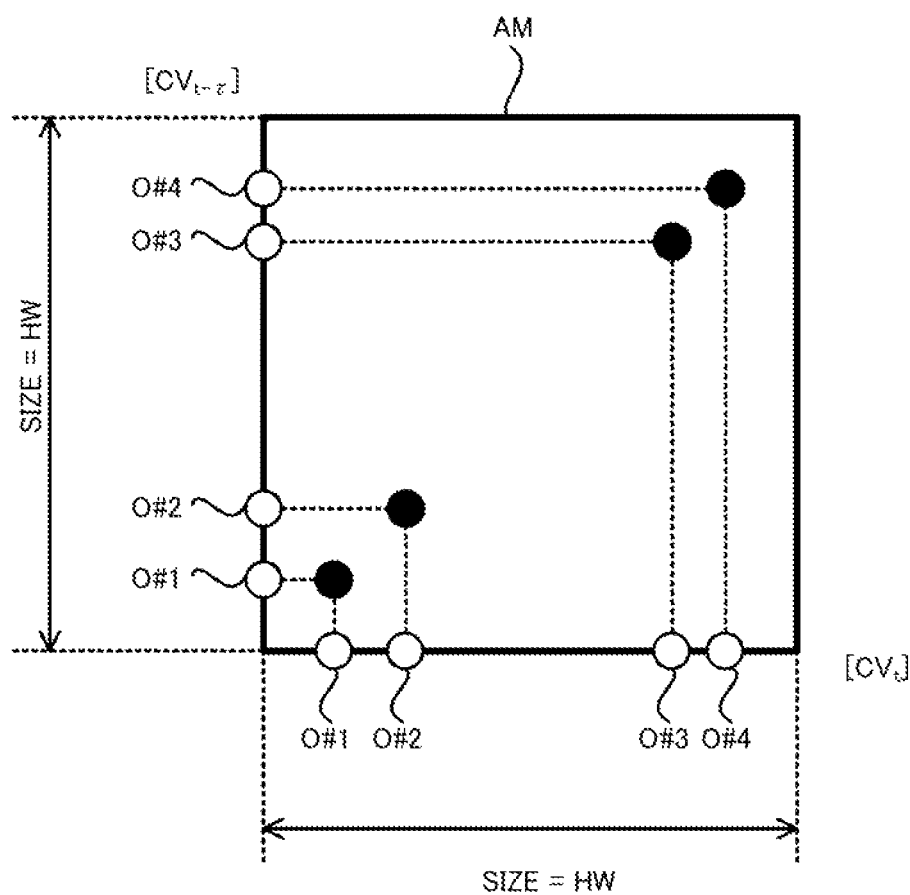
FIG. 5 is a planar view that conceptionally illustrates a relationship between a feature vector and an affinity matrix.

As a result, as illustrated in FIG. 5 that is planar view conceptually illustrating a relationship between the feature vectors $CV_{t-\tau}$ and $CV_t$ and the affinity matrix AM, the affinity matrix AM is an information indicating a correspondence relationship between the object $O_{t-\tau}$ and the object $O_t$. For example, the affinity matrix AM is an information that indicates (1) a first object $O_{t-\tau}$ of the plurality of objects $O_{t-\tau}$ corresponds to a first object $O_t$ of the plurality of objects $O_t$ (namely, both are the same objects), (2) a second object $O_{t-\tau}$ of the plurality of objects $O_{t-\tau}$ corresponds to a second object $O_t$ of the plurality of objects $O_{t-\tau}$ . . . , and (N) a N-th object $O_{t-\tau}$ of the plurality of objects $O_{t-\tau}$ corresponds to a N-th object $O_t$ of the plurality of objects $O_t$. Note that the affinity matrix AM may be referred to as a correspondence information, because it is the information indicating a correspondence relationship between the object $O_{t-\tau}$ and the object $O_t$.

Specifically, as illustrated in FIG. 5, the affinity matrix AM may be regarded to be a matrix in which a vertical axis corresponds to a vector component of the feature vector $CV_{t-\tau}$ and a horizontal axis corresponds to a vector component of the feature vector $CV_t$. Thus, a size of the vertical axis of the affinity matrix is HW (namely, the size of the feature vector $CV_{t-\tau}$, and a size corresponding to a size (namely, the number of the pixel) of the image $IM_{t-\tau}$ captured at the time t-τ. Similarly, a size of the horizontal axis of the affinity matrix is HW (namely, the size of the feature vector $CV_t$, and a size corresponding to a size (namely, the number of the pixel) of the image $IM_t$ captured at the time t. In other words, the affinity matrix AM may be regarded to be a matrix in which the vertical axis corresponds to the detected result of the object $O_{t-\tau}$ (namely, a detected position of the object $O_{t-\tau}$) included in the image $IM_{t-\tau}$ at the time t-τ and the horizontal axis corresponds to the detected result of the object $O_t$ (namely, a detected position of the object $O_t$) included in the image $IM_t$ at the time t. In this case, an element of the affinity matrix AM reacts (typically, has a value that is not zero) at a position at which a vector component corresponding to a certain object $O_{t-\tau}$ on the vertical axis intersects with a vector component corresponding to the same object $O_t$ on the horizontal axis. In other words, the element of the affinity matrix AM reacts at a position at which the detected result of the object $O_{t-\tau}$ on the vertical axis intersects with the detected result of the object $O_t$ on the horizontal axis. Namely, the affinity matrix AM is typically a matrix in which a value of the element at the position at which the vector component corresponding to a certain object $O_{t-\tau}$ included in the feature vector $CV_{t-\tau}$ intersects with the vector component corresponding to the same object $O_t$ included in the feature vector $CV_t$ is a value that is obtained by multiplying both vector components (namely, a value that is not zero) and a value(s) of the other element(s) is zero.

For example, in an example illustrated in FIG. 5, the element of the affinity matrix AM reacts at a position at which the vector component corresponding to an object O #k (note that k is the number of the detected object O, and k=1, 2, 3 or 4 in the example illustrated in FIG. 5) included in the feature vector $CV_{t-\tau}$ intersects with the vector component corresponding to the same object O #k included in the feature vector $CV_t$. Namely, the element of the affinity matrix AM reacts at a position at which the detected result of the object O #k included in the image $IM_{t-\tau}$ intersects with the detected result of the object O #k included in the image $IM_t$.

Conversely, when the element of the affinity matrix AM does not reacts (typically, is zero) at the position at which the vector component corresponding to a certain object $O_{t-\tau}$ included in the feature vector $CV_{t-\tau}$ intersects with the vector component corresponding to the same object $O_t$ included in the feature vector $CV_t$, it is presumed that the object $O_{t-\tau}$ included in the image $IM_{t-\tau}$ is not included in the image $IM_t$ (for example, goes out of an imaging angle of view of the camera).

As described above, the affinity matrix AM is usable as the information indicating the correspondence relationship between the object $O_{t-\tau}$ and the object $O_t$. Namely, the affinity matrix AM is usable as the information indicating the matching result of the object $O_{t-\tau}$ included in the image $IM_{t-\tau}$ and the object $O_t$ included in the image $IM_t$. The affinity matrix AM is usable as an information for tracking the position of the object $O_{t-\tau}$, which has been included in the image $IM_{t-\tau}$ in the image $IM_t$.

The information indicating the affinity matrix AM generated by the matrix calculation unit 225 is stored in the object matching DB 33 as the object matching information indicating the result of the object matching operation by the object matching unit 22. Alternatively, the matrix calculation unit 225 may generate, based on the affinity matrix AM, another type of information indicating the correspondence relationship between the object $O_{t-\tau}$ and the object $O_t$, and another type of information indicating the correspondence relationship between the object $O_{t-\tau}$ and the object $O_t$, may be stored in the object matching DB 33 as the object matching information.

(2-3) Refinement Operation

Figure 6:
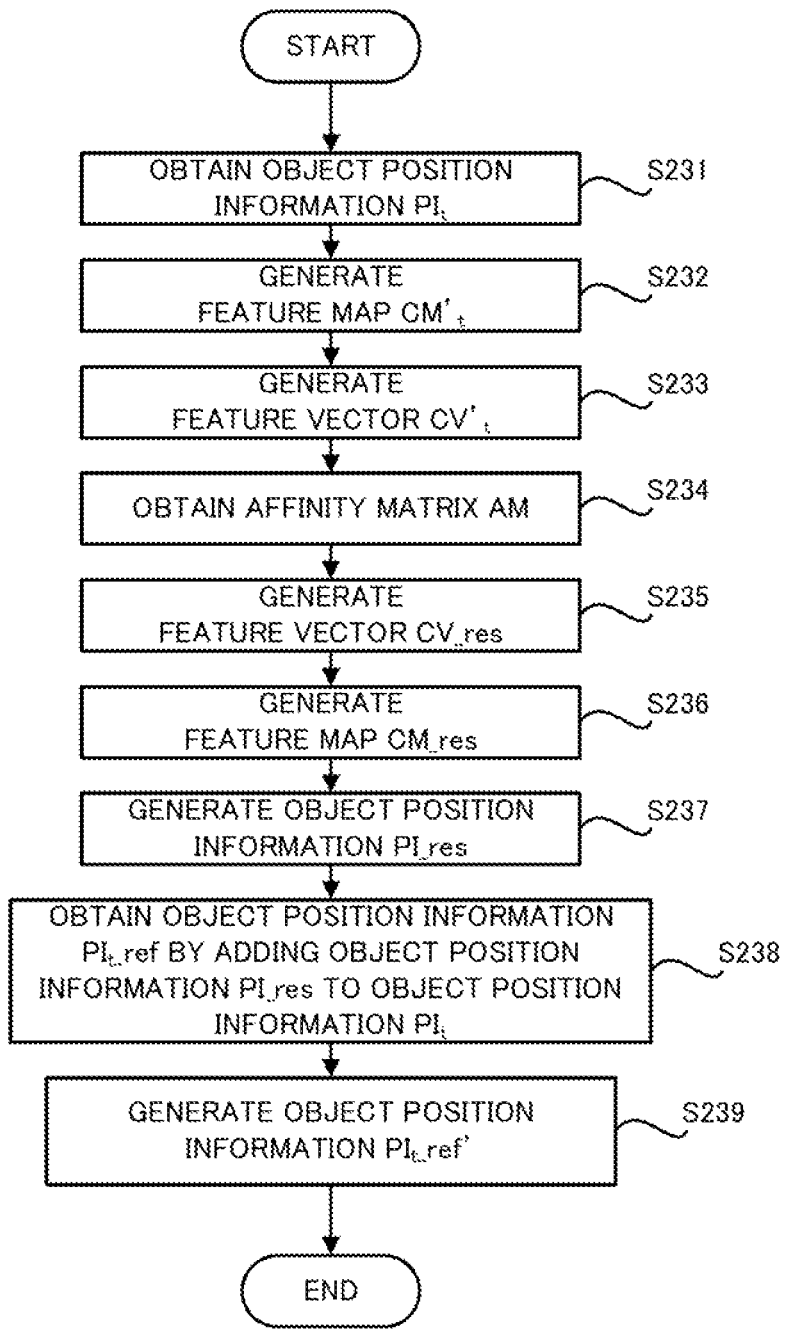
FIG. 6 is a flow chart that illustrates a flow of the refinement operation.

Next, the refinement operation performed by the refinement unit 23 that is one specific example of a "correction unit" will be described. The refinement unit 23 reads the object position information PI stored in the object detection DB 32, obtains the affinity matrix AM from the object matching unit 22, and corrects the read object position information PI by using the obtained affinity matrix AM. In the below described description, with reference to FIG. 6, the refinement operation for correcting the object position information $PI_t$ by using the affinity matrix AM that is generated based on the object position information $PI_{t-\tau}$ and $PI_t$ will be described. FIG. 6 is a flowchart that illustrates a flow of the refinement operation.

As illustrated in FIG. 6, the feature map conversion unit 236 obtains (namely, reads) the object position information $PI_t$ stored in the object detection DB 32 (a step S231). Then, the feature map conversion unit 236 generates a feature map CM't from the object position information $PI_t$ obtained at the step S231 (a step S232). Here, as described above, the feature map conversion unit 223 of the object matching unit 22 also generates the feature map $CM_t$ from the object position information $PI_t$. However, the feature map conversion unit 223 generates the feature map $CM_t$ for the purpose of generating the affinity matrix AM (namely, for the purpose of performing the object matching operation). The feature map conversion unit 223 generates the feature map $CM_t$ for the purpose of generating the affinity matrix AM. On the other hand, the feature map conversion unit 236 generates the feature map CM'$_t$ for the purpose of correcting the object position information $PI_t$ by using the affinity matrix AM generated by the object matching operation (namely, for the purpose of performing the refinement operation). Thus, the feature map conversion units 223 and 236 learned (namely, updated) by a below described learning operation are different from each other in that the feature map conversion unit 223 generates the feature map $CM_t$ that is more suitable for generating the affinity matrix AM and the feature map conversion unit 236 generates the feature map $CM'_t$ that is more suitable for correcting the object position information $PI_t$. Namely, the feature maps $CM_t$ and $CM'_t$ are different from each other in that the feature map $CM_t$ is more suitable for generating the affinity matrix AM and the feature map $CM'_t$ is more suitable for correcting the object position information $PI_t$. Thus, the refinement unit 23 includes the feature map conversion unit 236 separately from the feature map conversion unit 223 of the object matching unit 22. Note that the feature map conversion units 223 and 236 are built as a result of the below described learning operation. Namely, the below describe learning operation allows the feature map conversion unit 223 to be learned so as to generate the feature map $CM_t$ that is more suitable for generating the affinity matrix AM and allows the feature map conversion unit 236 to be learned so as to generate the feature map $CM'_t$ that is more suitable for correcting the object position information $Pi_t$.

The feature map conversion unit 236 may generate the feature map $CM'_t$ by using a calculation model that is configured to output the feature map CM when the object position information PI is inputted thereto. One example of the calculation model is a calculation model using a Neural Network (for example, a CNN: Convolutional Neural Network). In this case, a learning of the calculation model may be performed by using learning data, as described later. Namely, a parameter of the calculation model may be optimized so as to output the proper feature map CM (especially, for correcting the object position information $PI_t$).

Then, the feature vector conversion unit 237 generates a feature vector $CV'_t$ from the feature map $CM'_t$ generated at the step S232 (a step S233).

In parallel with, after or before the processing from the step S231 to the step S233, the matrix calculation unit 231 obtains the affinity matrix AM generated by the object matching unit 22 from the object matching unit 22 (a step S234). Alternatively, the matrix calculation unit 231 may obtain the affinity matrix AM generated by the object matching unit 22 from the object matching DB 33 (the step S234).

Then, the matrix calculation unit 231 generates a feature vector CV_res by using the feature vector $CV'_t$ generated at the step S233 and the affinity matrix AM obtained at the step S234 (a step S235). Specifically, the matrix calculation unit 231 generates, as the feature vector CV_res, an information that is obtained by a calculation processing using the feature vector $CV'_t$ and the affinity matrix AM.

For example, the matrix calculation unit 231 may generate, as the feature vector CV_res, an information that is obtained by a calculation processing for calculation a matrix product of the feature vector $CV'_t$ and the affinity matrix AM (namely, the matrix product of the feature vector $CV'_t$ and the affinity matrix AM).

Then, the feature vector conversion unit 232 generates a feature map CM res having a size that is same as that of the feature map CM from the feature vector CV_res generated at the step S235 (a step S236). Namely, the feature vector conversion unit 232 generates the feature map CM_res having a size of H×W×C from the feature vector CV_res having any size. For example, the feature vector conversion unit 232 may generate the feature map CM_res by converting the feature vector CV_res into the feature map CM_res.

Then, the feature map conversion unit 233 generates the object position information $PI_t$ res having a size that is same as that of the object position information $PI_t$ from the feature map CM_res generated at the step S236 (a step S237). Namely, the feature map conversion unit 233 generates the object position information $PI_t$ res that is the map information having the size of H×W×(K+4) from the feature map CM_res generated at the step S236. The feature map conversion unit 233 generates, from the feature map CM_res generated at the step S236, the object position information $PI_t$ res that includes (i) the map information that has a size of H×W×K and that indicates the center point KP of the object $O_t$ in the image $IM_t$, (ii) the map information that has a size of H×W×2 and that indicates the size of the detection frame BB of the object $O_t$ in the image $IM_t$, and (iii) the map information that has a size of H×W×2 and that indicates the correction amount of the detection frame BB of the object $O_t$ in the image $IM_t$. namely, the feature map conversion unit 233 generates the object position information $PI_t$ res from the feature map CM_res by converting a dimension of the feature map CM_res generated at the step S236.

For example, the feature map conversion unit 233 may generate the object position information $PI_t$ res by converting the feature map CM_res into the object position information $PI_t$ res. The feature map conversion unit 233 may generate the object position information $PI_t$ res by using a calculation model that is configured to output the object position information PI when feature map CM is inputted thereto. One example of the calculation model is a calculation model using a Neural Network (for example, a CNN: Convolutional Neural Network). In this case, a learning of the calculation model may be performed by using learning data, as described later. Namely, a parameter of the calculation model may be optimized so as to output the proper object position information $PI_t$ res.

A processing at the step S237 may be regarded to be substantially equivalent to a processing for generating the object position information $PI_t$ res by using an attention mechanism that uses the affinity matrix AM as a weight. Namely, the refinement unit 23 may be regarded to constitute at least a part of the attention mechanism including the matrix calculation unit 231, the feature vector conversion unit 232 and the feature map conversion unit 233. The object position information PI res may be used as the refined object position information $PI_t$. In this case, the processing at the step S237 may be regarded to be substantially equivalent to a processing for correcting (in other words, updating, adjusting or improving) the object position information $PI_t$ by using the attention mechanism that uses the affinity matrix AM as the weight.

However, there is a possibility that an information included in the original object position information $PI_t$ (namely, the object position information $PI_t$ on which the refinement operation is not performed) is lost from the object position information $PI_t$ res generated at the step S235. This is because the affinity matrix AM that indicates a part to which the attention mechanism should pay attention (in the present example embodiment, the detected position of the object $O_t$) is used as the weight, and thus, there is a possibility that an information part of the object detection information that is different from an information related to the detected position of the object $O_t$ is lost in the object position information $PI_t$ res. Thus, in the present example embodiment, the refinement unit 23 may further perform a processing for preventing the loss of the information included in the original object position information $PI_t$. Specifically, the residual processing unit 234 may generate an object position information $PI_t\_ref$ by adding the object position information $PI_t\_res$ generated at the step S237 to the original object position information $PI_t$ (a step S238). The object position information $PI_t\_ref$ has a size that is same as that of the object position information $PI_t$. Thus, the residual processing unit 234 generates the object position information $PI_t\_ref$ that is the map information having a size of $H \times W \times (K+4)$. In order to generate the object position information $PI_t\_ref$ that is the map information having the size of $H \times W \times (K+4)$, the residual processing unit 234 (i) adds the map information indicating the center point KP of the object $O_t$ included in the object position information $PI_t\_res$ and the map information indicating the center point KP of the object $O_t$ included in the original object position information $PI_t$, (ii) adds the map information indicating the size of the detection frame BB of the object $O_t$ included in the object position information $PI_t\_res$ and the map information indicating the size of the detection frame BB of the object $O_t$ included in the original object position information $PI_t$, and (iii) adds the map information indicating the correction amount of the detection frame BB included in the object position information $PI_t\_res$ and the map information indicating the correction amount of the detection frame BB included in the original object position information $PI_t$.

In this case, a processing at the step S238 may be regarded to be substantially equivalent to a processing for generating the object position information $PI_t\_ref$ by using a residual attention mechanism including the residual processing unit 234. Namely, the refinement unit 23 may be regarded to constitute at least a part of the residual attention mechanism including the matrix calculation unit 231, the feature vector conversion unit 232, the feature map conversion unit 233 and the residual processing unit 234. The object position information $PI_t\_ref$ is the refined object position information $PI_t$ and includes the information included in the original object position information $Pi_t$. In this case, the object position information $PI_t\_ref$ may be used as the refined object position information $PI_t$. However, the refinement unit 23 may not perform the processing for preventing the loss of the information included in the original object position information $PI_t$ (the processing at the step S238). In this case, the refinement unit 23 may not include the residual processing unit 234.

Furthermore, the feature map conversion unit 235 may generate, from the object position information $PI_t\_ref$, an object position information $PI_t\_ref'$ having a size: $H \times W \times (K+4)$ that is same as that of the object position information $PI_t\_ref$ (a step S239). The object position information $PI_t\_ref'$ has the size that is same as that of the object position information $PI_t$. Thus, the feature map conversion unit 234 generates the object position information $PI\_ref'$ that is the map information having the size: $H \times W \times (K+4)$. Typically, the feature map conversion unit 235 may generate the object position information $PI_t\_ref'$ by performing a convolution processing (for example, a processing performed at a convolution layer of a Neural Network) on the object position information $PI_t\_ref$. The feature map conversion unit 235 may convert the object position information $PI_t\_ref$ into the object position information $PI_t\_ref'$ by inputting the object position information $PI_t\_ref$ into the convolution layer of the Neural Network. In this case, the object position information $PI_t\_ref'$ may be used as the refined object position information $PI_t$. However, the refinement unit 23 may not include the feature map conversion unit 235.

When the object position information $PI_t\_res$, the object position information $PI_t\_ref$ or the object position information $PI_t\_ref'$ is used as the refined object position information $PI_t$, the object position information $PI_t$ stored in the object detection DB 32 may be replaced by the object position information $PI_t\_res$, the object position information $PI_t\_ref$ or the object position information $PI_t\_ref'$. In this case, the object matching unit 22 is capable of performing the object matching operation for performing the matching between the object $O_t$ included in the image $IM_t$ captured at the time t and an object $O_{t+\tau}$ included in an image $IM_{t+\tau}$ captured at a time $t+\tau$ by using the refined object position information $PI_t$, instead of the not-refined object position information $PI_t$. furthermore, an object position information $PI_{t+\tau}$ related to the object $O_{t+\tau}$ is refined by using the result of the object matching operation for performing the matching between the object $O_t$ and the object $O_{t+\tau}$. Thus, the object matching unit 22 is capable of performing the object matching operation for performing the matching between the object $O_{t+\tau}$ included in the image $IM_{t+\tau}$ captured at the time $t+\tau$ and an object $O_{t+2\tau}$ included in an image $IM_{t+}2\tau$ captured at a time $t+2\tau$ by using the refined object position information $PI_{t+\tau}$, instead of the not-refined object position information $PI_{t+\tau}$. Namely, when the object position information $PI_t$ stored in the object detection DB 32 is replaced by the object position information $PI_t\_res$, the object position information $PI_{t-\tau}\_ref$ or the object position information $PI_t\_ref'$, the refined object position information PI is sequentially inputted into the object matching unit 22. Thus, an improvement of an accuracy of the matching of the object O and a reduction of a processing cost necessary for the object tracking operation are expected, compared to a case where the object matching operation is performed by using the not-refined object position information PI.

(3) Technical Effect of Object Tracking Apparatus 1

As described above, the object tracking apparatus 1 in the present example embodiment is capable of generating the affinity matrix AM from the object position information $PI_{t-\tau}$ and $PI_t$, and refining the object position information $PI_t$ by using the affinity matrix AM. Namely, the object tracking apparatus 1 is capable of performing the object matching operation without performing an pre-processing on the object position information $PI_{t-\tau}$ and $PI_t$ that are outputs of the object detection unit 21. In other words, the object tracking apparatus 1 is capable of using, as an input to the object matching unit 22 that performs the object matching operation, the object position information $PI_{t-\tau}$ and $PI_t$ that are the outputs of the object detection unit 21. Similarly, the object tracking apparatus 1 is capable of performing the refinement operation without performing an pre-processing on the affinity matrix AM that is an output of the object matching unit 22. In other words, the object tracking apparatus 1 is capable of using, as an input to the refinement unit 23 that performs the refinement operation, the affinity matrix AM that is the output of the object matching unit 22 and the object position information PI that is the output of the object detection unit 21. Thus, the object tracking operation does not necessarily perform the pre-processing and the like for performing each of the object detection operation, the object matching operation and the refinement operation, compared to an object tracking apparatus in a comparison example that performs the object detection operation, the object matching operation and the refinement operation as three separate and independent operations As a result, the object tracking apparatus 1 is capable of tracking the object O with relatively low processing cost.

Incidentally, it can be said that the object tracking apparatus performs the refinement operation by using an information generated by the object matching operation by considering that the object tracking operation is similar to an operation performed by a general attention mechanism. Specifically, in the object tracking operation, a processing for detecting the object O, a processing for performing a matching of the object O and a processing for refining a detected result of the object O are performed, as described above. On the other hand, in the general attention mechanism, a processing for extracting a feature of the object O, a processing for calculating a weight and a processing for refining an extracted result of the feature of the object O are performed. The object tracking apparatus 1 substantially uses the processing for calculating the weight in the attention mechanism as the processing for performing the matching of the object O in the object tracking operation. In other words, the object tracking apparatus 1 substantially uses the processing for performing the matching of the object O in the object tracking operation as the processing for calculating the weight in the attention mechanism. Therefore, it can be said that the object tracking apparatus 1 realizes the object detection operation, the object matching operation and the refinement operation by using the attention mechanism. Specifically, it can be said that the object tracking apparatus 1 performs the object tracking operation by using the attention mechanism that uses the object position information $PI_{t-\tau}$ as a query, the object position information $PI_t$ as a key and a value, and the affinity matrix AM as the weight. Thus, the object tracking apparatus 1 is capable of performing, as a series of operation, the object tracking operation including the object detection operation, the object matching operation and the refinement operation. Namely, the object tracking apparatus 1 is capable of performing the object tracking operation by using a single network structure (what we call an End to End network structure in a single stage type) that performs the object detection operation, the object matching operation and the refinement operation. Since the object tracking operation (especially, the refinement operation) can be performed by using the attention mechanism, the object tracking apparatus 1 is capable of refining the object position information PI more properly, compared to a case where the object tracking operation is performed without using the attention mechanism (namely, a network structure the performs the object detection operation, a network structure the performs the object matching operation a network structure the performs the refinement operation are used separately and independently).

Moreover, when an object the number of which is $N_{t-\tau}$ is included in the image captured at the time t-τ and an object the number of which is $N_t$ is included in the image captured at the time t, the object tracking apparatus in the comparison example (especially, the object tracking apparatus that performs the object matching operation without generating the affinity matrix AM) needs to perform the matching between each of the $N_{t-\tau}$ object and each of the $N_t$ object individually. Namely, the object tracking apparatus needs to repeat the operation for performing the matching between two objects by $N_{t-\tau} \times N_t$ times. Thus, there is a possibility that the processing cost for tracking the object is high, which is a technical problem. On the other hand, the object tracking apparatus 1 in the present example embodiment is capable of performing the object matching operation for performing the matching between the object $O_{t-\tau}$ included in the image $IM_{t-\tau}$ captured at the time t-τ and the object $O_t$ included in the image $IM_t$ captured at the time t by using the feature vectors $CV_{t-\tau}$ and $CV_t$. Thus, the object tracking apparatus 1 is capable of tracking the object O with relatively low cost. Specifically, even when the object O the number of which is $N_{t-\tau}$ (note that $N_{t-\tau}$ is an integer equal to or larger than 1) is included in the image $IM_{t-\tau}$ and the object O the number of which is $N_t$ (note that $N_t$ is an integer equal to or larger than 1) are included in the image $IM_t$, the object tracking apparatus 1 does not necessarily perform the matching between each of the $N_{t-\tau}$ object $O_{t-\tau}$ and each of the $N_t$ object $O_t$ individually. Namely, the object tracking apparatus 1 does not necessarily repeat the operation for performing the matching between two objects $O_{t-\tau}$ and $O_t$ by $N_{t-\tau} \times N_t$ times. Namely, the object tracking apparatus 1 is capable of completing the matching between each of the $N_{t-\tau}$ object $O_{t-\tau}$ and each of the $N_t$ object $O_t$ by performing the processing for generating the affinity matrix AM by using the feature vectors $CV_{t-\tau}$ and $CV_t$ at once. Thus, it is possible to track the object O with relatively low processing cost compared to the object tracking apparatus in the comparison example. Especially, although the processing cost increases exponentially as the number of the object O included in the image IM increases in the object tracking apparatus in the comparison example, the processing cost is less likely to depend on the number of the object O included in the image IM in the object tracking apparatus 1 in the present example embodiment. Thus, an effect of reduction of the processing cost by the object tracking apparatus 1 is more remarkable as the number of the object O included in the image IM increases.

(4) Modified Example (4-1) First Modified Example

Figures 7, 8:
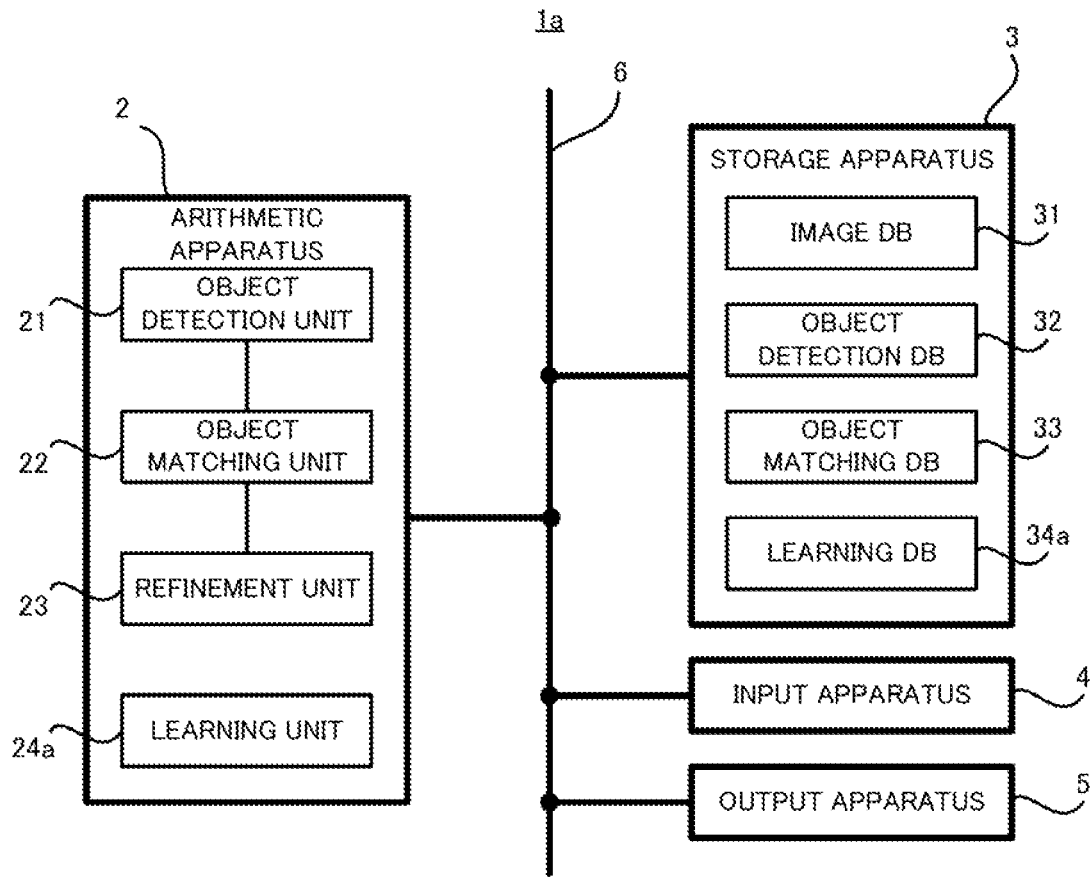
FIG. 7 is a block diagram that illustrates a configuration of an object tracking apparatus in a first modified example.
FIG. 8 is a data structure diagram that illustrates a data structure of a learning DB.

Firstly, with reference to FIG. 7, an object tracking apparatus 1a in a first modified example will be described. FIG. 7 is a block diagram that illustrates a configuration of the object tracking apparatus 1a in the first modified example.

As illustrated in FIG. 7, the object tracking apparatus 1a in the first modified example is different in that it includes a learning unit 24a that is configured to perform the learning operation for the object detection unit 21, the object matching unit 22 and the refinement unit 23 as a logical functional block implemented in the arithmetic apparatus 2. Furthermore, the object tracking apparatus 1a is different in that the storage apparatus 3 stores a learning DB 34a for storing learning data 341a for the learning operation. A residual feature of the object tracking apparatus 1a may be same as residual feature of the object tracking apparatus 1. Note that the learning operation is typically performed before the object tracking apparatus 1a actually performs the object tracking operation. However, the learning operation may be performed at a desired timing after the object tracking apparatus 1a starts the object tracking operation.

The learning data 341a include the image IM obtained (in other words, captured) at a certain time, for example, as illustrated in FIG. 8. Furthermore, the learning data 341a include an object position information PI label that indicates a ground truth label of the of the position of the object O included in the image IM. In an example illustrated in FIG. 8, the learning DB 34a stores a plurality of learning data 341a including: the learning data 341a that includes an image $IM_s$ obtained at a time s and an object position information $PI_s$ label related to the position of an object $O_s$ included in the image $IM_s$; and the learning data 341a that includes an image $IM_{s+\tau}$ obtained at a time s+τ and an object position information $PI_{s+\tau}$ label related to the position of an object $O_{s+\tau}$ included in the image $IM_{s+\tau}$. Incidentally, when the plurality of object O are included in each image IM, the learning data 341a may include a plurality of object position information PI_label that indicate the ground truth labels of the positions of the plurality of objects O, respectively.

In order to perform the learning operation, the learning unit 24a inputs the images $IM_s$ and $IM_{s+\tau}$ include in the learning data 341a into the object detection unit 21. As a result, the object detection unit 21 outputs an object position information $PI_s$ related to the position of the object $O_s$ and an object position information $PI_{s+\tau}$ related to the position of the object $O_{s+\tau}$. Furthermore, the object matching unit 22 generates the affinity matrix AM by using the object position information $PI_s$ and the object position information $PI_{s+\tau}$. Furthermore, the refinement unit 23 refines t the object position information $PI_{s+\tau}$ by using the affinity matrix AM.

The learning unit 24a updates, based on at least a loss function L1 related to the refined object position information $PI_{s+\tau}$, the learnable calculation model that is used by the object detection unit 21 to perform the object detection operation, is used by the object matching unit 22 to perform the object matching operation and/or is used by the refinement unit 23 to perform the refinement operation. Namely, the learning unit 24a updates, based on the loss function L1, the calculation model that defines a detail of an operation of at least one of the object detection unit 21, the object matching unit 22 and the refinement unit 23. As one example, when the loss function L1 is a loss function that decreases as a difference between the refined object position information $PI_{s+\tau}$ and the object position information $PI_{s+\tau}$_label that is the ground truth label decreases, the learning unit 24a may update the calculation model so that the loss function L1 decreases (typically, is minimized).

In the present example embodiment, the object detection unit 21, the object matching unit 22 and the refinement unit 23 can be realized by the single network structure (namely, a single calculation model) as described above. Thus, when the object detection unit 21, the object matching unit 22 and the refinement unit 23 can be realized by the single network structure (namely, the single calculation model), the learning unit 24a may update the single calculation unit. Note that one example of the calculation model is a calculation model using a Neural Network (for example, a CNN: Convolutional Neural Network). In this case, an operation for updating the calculation model may include an operation for updating, determining or adjusting a parameter of the calculation model. The parameter of the calculation model may include at least one of a weight between nodes of the Neural Network, a bias added at each node and a connection path between the nodes.

The learning unit 24a repeats the learning operation by inputting the plurality of images IM, which are respectively included in the plurality of learning data 341a stored in the learning DB 34a, into the object detection unit 21 in sequence in an order of the time corresponding to the plurality of images IM. Namely, the learning unit 24a inputs the images $IM_s$ and $IM_{s+\tau}$ into the object detection unit 21, and updates the calculation model based on the loss function L1 related to the refined object position information $PI_{s+\tau}$. Then, the learning unit 24a inputs the images $IM_{s+\tau}$ and $IM_{s+2\tau}$ into the object detection unit 21, and updates the calculation model based on the loss function L1 related to the refined object position information $PI_{s+2\tau}$. Then, the learning unit 24a repeats the same operation. As a result, the calculation model that defines the detail of the operation of at least one of the object detection unit 21, the object matching unit 22 and the refinement unit 23 is properly updated (namely, learned).

The learning unit 24a may vary a temporal interval between two times each of which corresponds to respective one of two images IM inputted to the object detection unit 21. For example, in the above described description, the learning unit 24a inputs, to the object detection unit 21, two images IM each of which is obtained at respective one of two times that are different from each other by the temporal interval of "τ" (for example, the images $IM_s$ and $IM_{s+\tau}$). However, the learning unit 24a may input, to the object detection unit 21, two images IM each of which is obtained at respective one of two times that are different from each other by the temporal interval of "m×τ" (for example, the images $IM_s$ and $IM_{s+m\tau}$) (note that m is a coefficient that is variable by the learning unit 24a, and is an integer such as 1, 2, 3, . . . , for example). In this case, the learning unit 24a may input the images $IM_s$ and $IM_{s+m\tau}$ into the object detection unit 21, and updates the calculation model based on the loss function L1 related to the refined object position information $PI_{s+m\tau}$. Then, the learning unit 24a may input the images $IM_{s+m\tau}$ and $IM_{s+2m\tau}$ into the object detection unit 21, and updates the calculation model based on the loss function L1 related to the refined object position information $PI_{s+2m\tau}$. Then, the learning unit 24a repeats the same operation. In this case, a moving distance of the object O between two images IM inputted to the object detection unit 21 varies depending on the coefficient m. The coefficient m may be determined by a random number, for example, for every learning operation, namely, every time the learning unit 24a inputs two images IM (for example, the images $IM_s$ and $IM_{s+\tau}$) into the object detection unit 21. As a result, the calculation model that defines the detail of the operation of at least one of the object detection unit 21, the object matching unit 22 and the refinement unit 23 is updated so that the objects moving at various velocities can be traced.

The learning unit 24a may updates the calculation model based on not only the loss function L1 related to the refined object position information $PI_{s+\tau}$ but also a loss function L2 related to the object position information $PI_s$ outputted by the object detection unit 21 and a loss function L3 related to the object position information $PI_{s+\tau}$ outputted by the object detection unit 21. The loss function L2 may be a loss function that decreases as a difference between the object position information $PI_s$ outputted by the object detection unit 21 and the object position information $PI_s$_label that is the ground truth label decreases, for example. The loss function L3 may be a loss function that decreases as a difference between the object position information $PI_{s+\tau}$ outputted by the object detection unit 21 and the object position information $PI_{s+\tau}$_label that is the ground truth label decreases, for example. In this case, the learning unit 24a may update the calculation model so that a total sum of the loss functions L1 to L3 decreases (typically, is minimized).

When the loss functions L1 to L3 are used, the learning unit 24a may perform a weighting processing on the loss functions L1 to L3, and update the calculation model based on the loss functions L1 to L3 on which the weighting processing is already performed. Namely, the learning unit 24 may perform the weighting processing on each of the loss functions L1 to L3 by using respective one of weighting coefficients α1, α2 and α3, and update the calculation model based on a loss function that is specified by an equation of α1×L1+α2×L2+α3×L3.

As one example, each of the loss functions L1 and L3 are loss functions related to the object position information $PI_{s+\tau}$ and the loss function L2 is a loss function related to the object position information $PI_s$. From a viewpoint of appropriately updating the calculation model, it is preferable that a contribution of the object position information $PI_s$ (namely, a contribution of the loss functions L1 and L3) to the update of the calculation model be not significantly different from a contribution of the object position information $PI_{s+\tau}$ (namely, the contribution of the loss function L2) to the update of the calculation model. Typically, it is preferable that the contribution of the object position information $PI_s$ to the update of the calculation model be equal to the contribution of the object position information $PI_{s+\tau}$ to the update of the calculation model. Thus, the learning unit 24a may perform the weighting processing so that a weight for a total sum of the loss functions L1 and L3 is equal to a weight for the loss function L2. As one example, the learning unit 24a may perform the weighting processing on the loss functions L1 to L3 by using an equation of 0.5×(L1+L3)+0.5×L2, and update the calculation model based on a loss function that is specified by an equation of 0.5×(L1+L3)+0.5×L2. This weighting processing is particularly beneficial when the affinity matrix AM is normalized by using a softmax function in the third modified example described below. The following are the reasons for this. Firstly, when the affinity matrix AM is normalized by using the softmax function in an early stage of the learning operation, most of the elements of the affinity matrix AM are zero. As a result, the refined object position information $PI_{s+\tau}$ is identical to the object position information $PI_{s+\tau}$ detected by the object detection unit 21. Assuming that the weights of the loss functions L1 to L3 are the same (for example, all are 1) under such situation, a learning effect of the calculation model is reduced. This is because values of the loss functions L1 and L3 are the same, and thus, the contribution of the loss function L2 to the update of the calculation model is apparently smaller than the contribution of the loss functions L1 and L3 to the update of the calculation model. Thus, the learning unit 24a may perform the weighting processing so that the weight for the total sum of the loss functions L1 and L3 is equal to the weight for the loss function L2 in the early stage of the learning operation (namely, in an period when most of the elements of the affinity matrix AM are zero by a normalization processing). As a result, the learning unit 24a is less likely to lose its learning effect even in the early stage of the learning operation (namely, in an period when most of the elements of the affinity matrix AM are zero by a normalization processing).

Incidentally, the learning unit 24a may perform the weighting processing on the loss functions L1 to L3 by using an equation of 0.25×L1+0.25×L3+0.5×L2, and update the calculation model based on a loss function that is specified by an equation of 0.25×L1+0.25×L3+0.5×L2, in order to allow the contribution of the loss function L1 to the update of the calculation model to be equal to the contribution of the loss function L3 to the update of the calculation model.

(4-2) Second Modified Example

Figure 9:
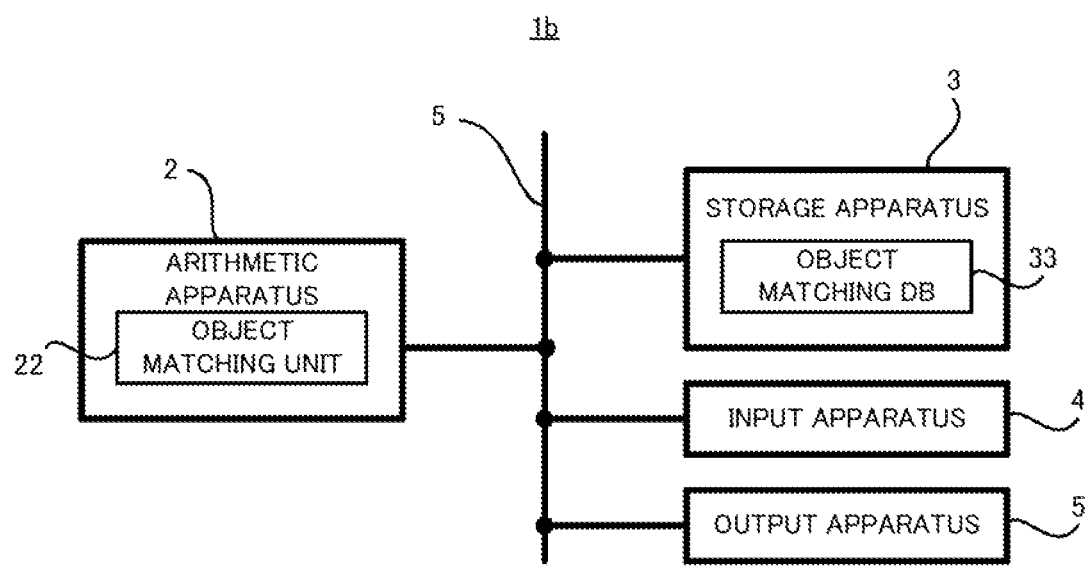
FIG. 9 is a block diagram that illustrates a configuration of an object tracking apparatus in a second modified example.

In the above described description, the object tracking apparatus 1 performs the object tracking operation including the object detection operation. However, in the second modified example, the object tracking operation may not include the object detection operation. Namely, the object tracking apparatus 1 may not perform the object detection operation. In this case, as illustrated in FIG. 9 that illustrates a configuration of an object tracking apparatus 1b that is a second modified example of the object tracking apparatus 1, the object tracking apparatus 1b may not include the object detection unit 21. Furthermore, the storage apparatus 3 may not store the image DB 31 for storing the image IM used to perform the object detection operation and the object detection DB 32 for storing the object detection information indicating the result of the object detection operation. The object tracking apparatus 1b (especially, the object matching unit 22) may perform the object matching operation by using the object detection information that indicates the result of the object detection operation performed by an apparatus different from the object tracking apparatus 1b.

In the above described description, the object tracking apparatus 1 performs the object tracking operation including the refinement operation. However, in the second modified example, the object tracking operation may not include the refinement operation. Namely, the object tracking apparatus 1 may not perform the refinement operation. In this case, as illustrated in FIG. 9 that illustrates the configuration of the object tracking apparatus 1b that is the second modified example of the object tracking apparatus 1, the object tracking apparatus 1b may not include the refinement unit 23. The refinement operation may be performed by an apparatus different from the object tracking apparatus 1b. In this case, the object tracking apparatus 1b (especially, the object matching unit 22) may output the object matching information indicating the result of the object matching operation to an apparatus that performs the refinement operation and that is different from the object tracking apparatus 1b.

(4-3) Third Modified Example

The matrix calculation unit 225 may normalize the affinity matrix AM obtained by the calculation processing using the feature vector $CV_{t-\tau}$ and the feature vector $CV_t$. For example, the matrix calculation unit 225 may normalize the affinity matrix AM by normalizing the matrix product of the feature vector $CV_{t-\tau}$ and the feature vector $CV_t$.

The matrix calculation unit 225 may perform any normalization processing on the affinity matrix AM. For example, the matrix calculation unit 225 may perform a normalization processing using a sigmoid function on the affinity matrix AM. In this case, each element of the affinity matrix AM is normalized using the sigmoid function.

Figure 10:
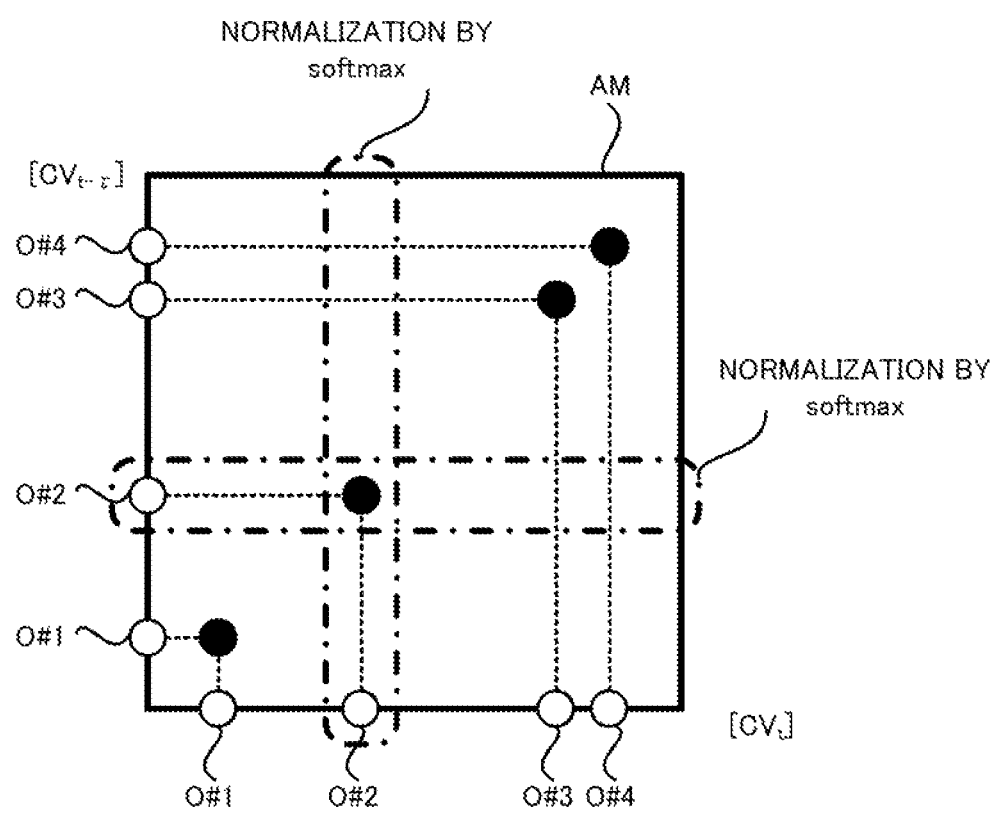
FIG. 10 illustrates an aspect in which the affinity matrix is normalized by using a softmax function.

Alternatively, for example, the matrix calculation unit 225 may perform normalization processing using a softmax function on the affinity matrix AM. Specifically, as illustrated in FIG. 10, the matrix calculation unit 225 may perform the normalization processing using the softmax function on each of the column vector component including a plurality of elements in each row of the affinity matrix AM and the column vector component including a plurality of elements in each column of the affinity matrix AM. In this case, the matrix calculation unit 225 may perform the normalization processing using the softmax function on the column vector component so that a total sum of the plurality of elements included in the column vector component is 1, and perform the normalization processing using the softmax function on the row vector component so that a total sum of the plurality of elements included in the row vector component is 1. Then, a matrix that includes the elements obtained by multiplying the vector component with the row vector component on which the normalization processing is already performed is the normalized affinity matrix AM. As one example, the matrix calculation unit 225 may perform the normalization processing using the softmax function on each of the column vector component including the plurality of elements in one row of the affinity matrix AM corresponding to the object $O_{t-\tau}$ and the column vector component including the plurality of elements in one column of the affinity matrix AM corresponding to the same object $O_t$. In this case, the matrix calculation unit 225 the matrix calculation unit 225 may perform the normalization processing using the softmax function on the column vector component so that a total sum of the plurality of elements included in the column vector component corresponding to the object $O_{t-\tau}$ is 1, and perform the normalization processing using the softmax function on the row vector component so that a total sum of the plurality of elements included in the row vector component corresponding to the object $O_t$ is 1. Then, a matrix that includes elements obtained by multiplying the vector component with the row vector component on which the normalization processing is already performed is the normalized affinity matrix AM.

(4-4) Other Modified Example

In the above described description, the object position information PI generated by the object detection unit 21 performing the object detection operation includes the information indicating the center point KP of the object O, the information indicating the size of the detection frame BB of the object O and the information indicating the correction amount of the detection frame BB. However, the object position information PI may not include at least one of the information indicating the size of the detection frame BB of the object O and the information indicating the correction amount of the detection frame BB. The object position information PI may include an information indicating a position of a part of the object O that is different from the center.

In the above described description, the object matching unit 22 generates the feature vector CV by using the object position information PI indicating the result of the object detection operation. Here, when the calculation model such as the Neural Network is used at the object detection operation as described above, the object matching unit 22 may generate the feature vector CV by using an intermediate output of the calculation model in addition to the object position information that is a final output of the calculation model. For example, the object matching unit 22 may generate the feature map CM by using an output of a hidden layer of the Neural Network that is used as the calculation model in addition to an output of an output layer of the Neural Network that is used as the calculation model, and then generate the feature vector CV from the generated feature map CM.

In the above described description, the matrix calculation unit 225 generates, as the affinity matrix AM, the information that is obtained by the calculation processing for calculating the matrix product of the feature vector $CV_{t-\tau}$ and the feature vector $CV_t$. However, the matrix calculation unit 225 may generate, as the affinity matrix AM, an information that is obtained by any calculation processing using the feature vector $CV_{t-\tau}$ and the feature vector $CV_t$. For example, the matrix calculation unit 225 may generate, as the affinity matrix AM, an information that is obtained by the calculation processing for calculating the matrix sum of the feature vector $CV_t$, and the feature vector $CV_t$. For example, the matrix calculation unit 225 may generate, as the affinity matrix AM, by using a calculation model that is configured to output the affinity matrix AM when the feature vector $CV_{t-\tau}$ and the feature vector $CV_t$ are inputted thereto. One example of the calculation model is a calculation model using a Neural Network (for example, a CNN: Convolutional Neural Network). It follows that the matrix calculation unit 225 may perform any calculation processing to generate the affinity matrix AM, as long as it performs the calculation processing that is capable of generating the affinity matrix AM indicating the correspondence relationship between the object $O_{t-\tau}$ and the object $O_t$.

In the above described description, the object matching unit 22 generates the affinity matrix AM having the size of HW×HW from the object position information PI that is the map information having the size of H×W×(K+4). However, the object matching unit 22 generates the affinity matrix AM having a size that is smaller than the size of HW×HW from the object position information PI having the size of H×W×(K+4). Namely, the object matching unit 22 may generate the downscaled affinity matrix AM. For example, the feature map conversion units 221 and 223 of the object matching unit 22 may generate the feature maps $CM_{t-\tau}$ and $CM_t$ each of which has a size that is smaller than the size of H×W×C from the object position information $PI_{t-\tau}$ and $PI_t$ each of which has the size of H×W×(K+4). In this case, the matrix calculation unit 225 of the object matching unit 22 is capable of generates the affinity matrix AM having the size that is smaller than the size of HW×HW from the feature map CM having the size that is smaller than the size of H×W×C. Incidentally, in order to generate the feature maps $CM_{t-\tau}$ and $CM_t$ each of which has the size that is smaller than the size of H×W×C, the feature map conversion units 221 and 223 of the object matching unit 22 may adjust a stride amount (namely, a moving distance) of a kernel (namely, a convolution filter) used in the convolution layer that performs the convolution processing for generating the feature maps $CM_{t-\tau}$ and $CM_t$. As the stride amount of the kernel increases, the size of each of the generated feature maps $CM_{t-\tau}$ and $CM_t$ decreases.

(5) Supplementary Note

With respect to the example embodiments described above, the following Supplementary Notes will be further disclosed.

[Supplementary Note 1]

An object tracking apparatus including:
a first generation unit that is configured to generate, based on a first position information related to a position of an object in a first image captured at a first time and a second position information related to a position of an object in a second image captured at a second time that is different from the first time, a first feature vector representing a feature of the first position information and a second feature vector representing a feature of the second position information; and
a second generation unit that is configured to generate, as a correspondence information indicating a correspondence relationship between the object in the first image and the object in the second image, an information that is obtained by a calculation processing using the first and the second feature vectors.

[Supplementary Note 2]

The object tracking apparatus according to Supplementary Note 1, wherein
the calculation processing includes a processing for calculating a matrix product of the first feature vector and the second feature vector.

[Supplementary Note 3]

The object tracking apparatus according to Supplementary Note 1 or 2, wherein
the correspondence information indicates the correspondence relationship between the object in the first image and the object in the second image by using a matrix.

[Supplementary Note 4]

The object tracking apparatus according to any one of Supplementary Notes 1 to 3, wherein
the second generation unit is configured to normalize the matrix by normalizing each of a vector component in one row of the matrix and a vector component in one column of the matrix by a softmax function.

[Supplementary Note 5]

The object tracking apparatus according to any one of Supplementary Notes 1 to 4, wherein
the correspondence information indicates the correspondence relationship between the object in the first image and the object in the second image by using a matrix in which an element react at a position at which a row vector component corresponding to one object in either one of the first and second images intersects with a column vector component corresponding to the one object in the other one of the first and second images,
the second generation unit is configured to normalize the matrix by normalizing each of the row vector component and each column vector component by a softmax function.

[Supplementary Note 6]

The object tracking apparatus according to any one of Supplementary Notes 1 to 4 further including a correction unit that is configured to correct the second position information by using the correspondence information.

[Supplementary Note 7]

The object tracking apparatus according to Supplementary Note 6, wherein
the correction unit is configured to correct the second position information by using an attention mechanism that uses the correspondence information as a weight.

[Supplementary Note 8]

The object tracking apparatus according to Supplementary Note 7, wherein
the correspondence information indicates the correspondence relationship between the object in the first image and the object in the second image by using a matrix.
the second position information includes a position map indicating an information related to a position of the object in the second image,
the attention mechanism is configured to correct the position map that is the second position information by performing a processing for calculating a matrix product of the position map and the correspondence map.

[Supplementary Note 9]

The object tracking apparatus according to Supplementary Note 8, wherein
the attention mechanism is configured to correct the position map that is the second position information by performing a processing for adding a correction map, which is obtained by calculating the matrix product of the position map and the correspondence information, to the position map.

[Supplementary Note 10]

The object tracking apparatus according to any one of Supplementary Notes 1 to 9, wherein
the first generation unit is configured to obtain, from a calculation model that outputs each of the first and second position information when the first and second images are inputted thereto, the first and second position information and an intermediate output information corresponding to an intermediate output of the calculation model,
the first generation unit is configured to generate the first and second feature vectors based on the first and second position information and the intermediate output information.

[Supplementary Note 11]

The object tracking apparatus according to any one of Supplementary Notes 1 to 10 further including:
a third generation unit that is configured to generate the first and second position information from the first and second images;
a correction unit that is configured to correct the second position information by using the correspondence information; and
a learning unit that is configured to input, into the third generation unit, learning data including the first and second images for a learning, and to update a learning model that defines a detail of an operation of at least one of the first to third generation units and the correction unit based on a first loss function related to the second position information corrected by the correction unit when the learning data is inputted to the third generation unit.

[Supplementary Note 12]

The object tracking apparatus according to Supplementary Note 11, wherein
the learning unit is configured to update the learning model based on the first loss function, a second loss function related to the first position information generated by the third generation unit when the learning data is inputted to the third generation unit and a third loss function related to the second position information generated by the third generation unit when the learning data is inputted to the third generation unit,
the learning unit is configured to perform a weighting processing on the first to third loss functions so that a weight of whole of the first and third loss functions is equal to a weight of the second loss function, and to generate the learning model based on the first to third loss functions on which the weighting processing is already performed.

[Supplementary Note 13]

The object tracking apparatus according to Supplementary Note 11 or 12, wherein
the learning unit is configured to input, into the first generation unit, a plurality of learning data sets having different intervals between the first time and the second time.

[Supplementary Note 14]

An object tracking method including:
generating, based on a first position information related to a position of an object in a first image captured at a first time and a second position information related to a position of an object in a second image captured at a second time that is different from the first time, a first feature vector representing a feature of the first position information and a second feature vector representing a feature of the second position information; and
generating, as a correspondence information indicating a correspondence relationship between the object in the first image and the object in the second image, an information that is obtained by a calculation processing using the first and the second feature vectors.

[Supplementary Note 15]

A non-transitory recording medium on which a computer program that allows a computer to execute an object tracking method is recorded, the object tracking method including:

generating, based on a first position information related to a position of an object in a first image captured at a first time and a second position information related to a position of an object in a second image captured at a second time that is different from the first time, a first feature vector representing a feature of the first position information and a second feature vector representing a feature of the second position information; and generating, as a correspondence information indicating a correspondence relationship between the object in the first image and the object in the second image, an information that is obtained by a calculation processing using the first and the second feature vectors.

[Supplementary Note 16]

A computer program that allows a computer to execute an object tracking method is recorded, the object tracking method including:

generating, based on a first position information related to a position of an object in a first image captured at a first time and a second position information related to a position of an object in a second image captured at a second time that is different from the first time, a first feature vector representing a feature of the first position information and a second feature vector representing a feature of the second position information; and generating, as a correspondence information indicating a correspondence relationship between the object in the first image and the object in the second image, an information that is obtained by a calculation processing using the first and the second feature vectors.

This disclosure is allowed to be changed, if desired, without departing from the essence or spirit of the invention which can be read from the claims and the entire specification, and an object tracking apparatus, an object tracking method and a recording medium, which involve such changes, are also intended to be within the technical scope of this disclosure.

DESCRIPTION OF REFERENCE CODES 1 object tracking apparatus
2 arithmetic apparatus
21 object detection unit
22 object matching unit
221, 223 feature map conversion unit
222, 224 feature vector conversion unit
225 matrix calculation unit
23 refinement unit
231 matrix calculation unit
232 feature vector conversion unit
233 feature map conversion unit
234 residual processing unit
235 feature map conversion unit
3 storage unit
31 image DB
32 object detection DB
33 object matching DB

What is claimed is:

1. An object tracking apparatus comprising:
at least one memory configured to store instructions; and
at least one processor configured to execute the instructions to:
generate, based on a first position information related to a position of an object in a first image captured at a first time and a second position information related to a position of an object in a second image captured at a second time that is different from the first time, a first feature vector representing a feature of the first position information and a second feature vector representing a feature of the second position information; and
generate, as a correspondence information indicating a correspondence relationship between the object in the first image and the object in the second image, an information that is obtained by a calculation processing using the first and the second feature vectors.

2. The object tracking apparatus according to claim 1, wherein
the calculation processing includes a processing for calculating a matrix product of the first feature vector and the second feature vector.

3. The object tracking apparatus according to claim 1, wherein
the correspondence information indicates the correspondence relationship between the object in the first image and the object in the second image by using a matrix.

4. The object tracking apparatus according to claim 3, wherein
the at least one processor is configured to execute the instructions to normalize the matrix by normalizing each of a vector component in one row of the matrix and a vector component in one column of the matrix by a softmax function.

5. The object tracking apparatus according to claim 1, wherein
the correspondence information indicates the correspondence relationship between the object in the first image and the object in the second image by using a matrix in which an element reacts at a position at which a row vector component corresponding to one object in either one of the first and second images intersects with a column vector component corresponding to the one object in the other one of the first and second images,
the at least one processor is configured to execute the instructions to normalize the matrix by normalizing each of the row vector component and each the column vector component by a softmax function.

6. The object tracking apparatus according to claim 1, wherein
the at least one processor is configured to execute the instructions to correct the second position information by using the correspondence information.

7. The object tracking apparatus according to claim 6, wherein
the at least one processor is configured to execute the instructions to correct the second position information by using an attention mechanism that uses the correspondence information as a weight.

8. The object tracking apparatus according to claim 7, wherein
the correspondence information indicates the correspondence relationship between the object in the first image and the object in the second image by using a matrix, the second position information includes a position map indicating an information related to a position of the object in the second image, the attention mechanism is configured to correct the position map that is the second position information by performing a processing for calculating a matrix product of the position map and the correspondence information.

9. The object tracking apparatus according to claim 8, wherein the attention mechanism is configured to correct the position map that is the second position information by performing a processing for adding a correction map, which is obtained by calculating the matrix product of the position map and the correspondence information, to the position map.

10. The object tracking apparatus according to claim 1, wherein the at least one processor is configured to execute the instructions to obtain, from a calculation model that outputs each of the first and second position information when the first and second images are inputted thereto, the first and second position information and an intermediate output information corresponding to an intermediate output of the calculation model, the at least one processor is configured to execute the instructions to generate the first and second feature vectors based on the first and second position information and the intermediate output information.

11. The object tracking apparatus according to claim 1, wherein the at least one processor is configured to execute the instructions to:

generate the first and second position information from the first and second images;

correct the second position information by using the correspondence information; and update a learning model that defines at least one of a first operation for generating the first and the second feature vectors, a second operation for generating the correspondence information, a third operation for generating the first and the second position information and a fourth operation for correcting the second position information based on a first loss function related to the second position information corrected by the fourth operation when learning data including the first and second images for a learning is used by the third operation.

12. The object tracking apparatus according to claim 11, wherein the at least one processor is configured to execute the instructions to update the learning model based on the first loss function, a second loss function related to the first position information generated by the third operation when the learning data is used by the third operation and a third loss function related to the second position information generated by the third operation when the learning data is used by the third operation, the at least one processor is configured to execute the instructions to perform a weighting processing on the first to third loss functions so that a weight of whole of the first and third loss functions is equal to a weight of the second loss function, and to generate the learning model based on the first to third loss functions on which the weighting processing is already performed.

13. The object tracking apparatus according to claim 11, wherein the at least one processor is configured to execute the instructions to allow the first operation to use a plurality of learning data having different intervals between the first time and the second time to update the learning model.

14. An object tracking method including:

generating, based on a first position information related to a position of an object in a first image captured at a first time and a second position information related to a position of an object in a second image captured at a second time that is different from the first time, a first feature vector representing a feature of the first position information and a second feature vector representing a feature of the second position information; and generating, as a correspondence information indicating a correspondence relationship between the object in the first image and the object in the second image, an information that is obtained by a calculation processing using the first and the second feature vectors.

15. A non-transitory computer readable recording medium on which a computer program that allows a computer to execute an object tracking method is recorded, the object tracking method including:

generating, based on a first position information related to a position of an object in a first image captured at a first time and a second position information related to a position of an object in a second image captured at a second time that is different from the first time, a first feature vector representing a feature of the first position information and a second feature vector representing a feature of the second position information; and generating, as a correspondence information indicating a correspondence relationship between the object in the first image and the object in the second image, an information that is obtained by a calculation processing using the first and the second feature vectors.

* * * * *